Dec. 9, 1969  J. P. ETTINGER ET AL  3,483,433
MODULAR POWER SUPPLY
Filed Jan. 31, 1968  5 Sheets-Sheet 1

INVENTORS
JAMES P. ETTINGER
CHRISTIAN S. OTTESON
BY
James and Franklin
ATTORNEYS

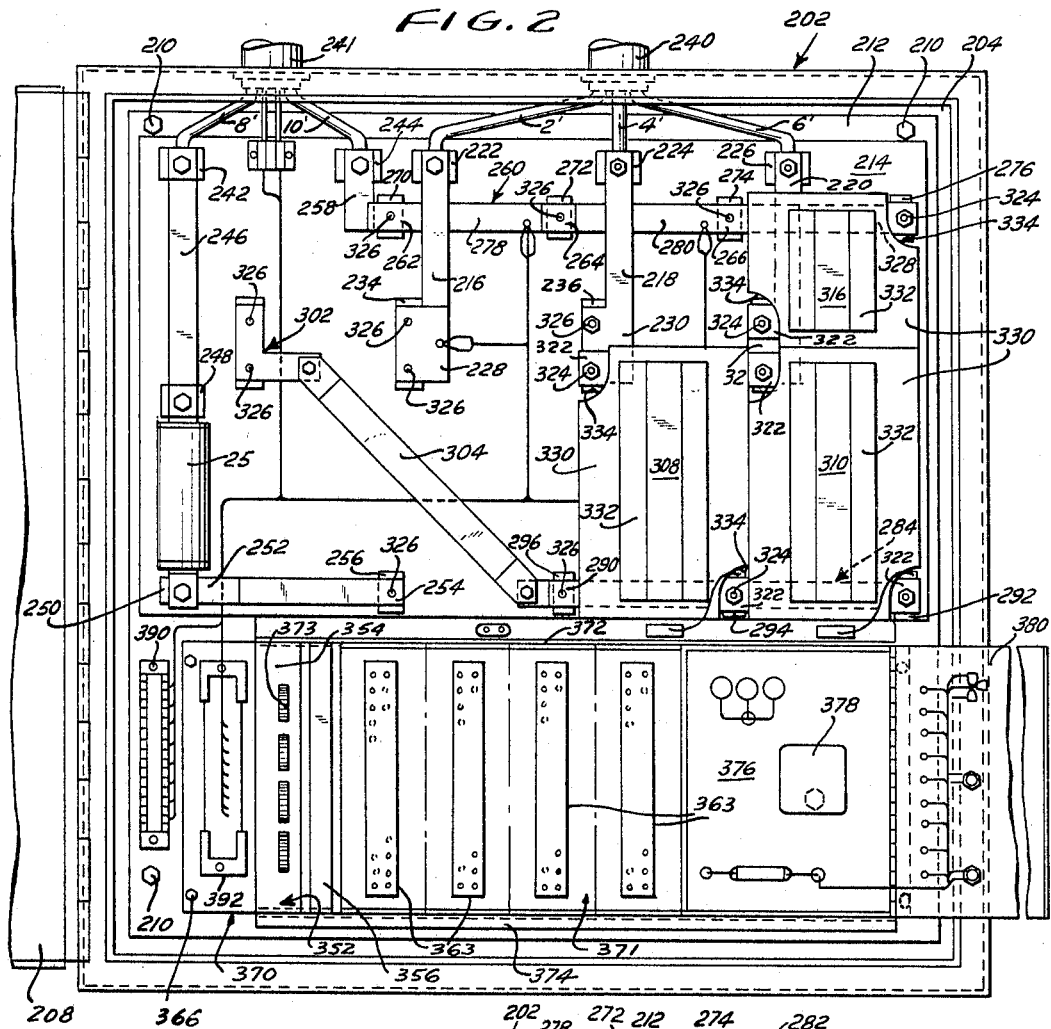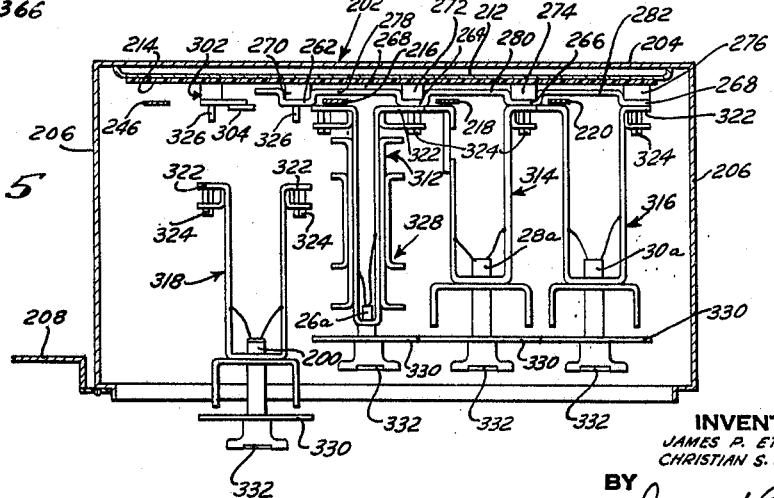

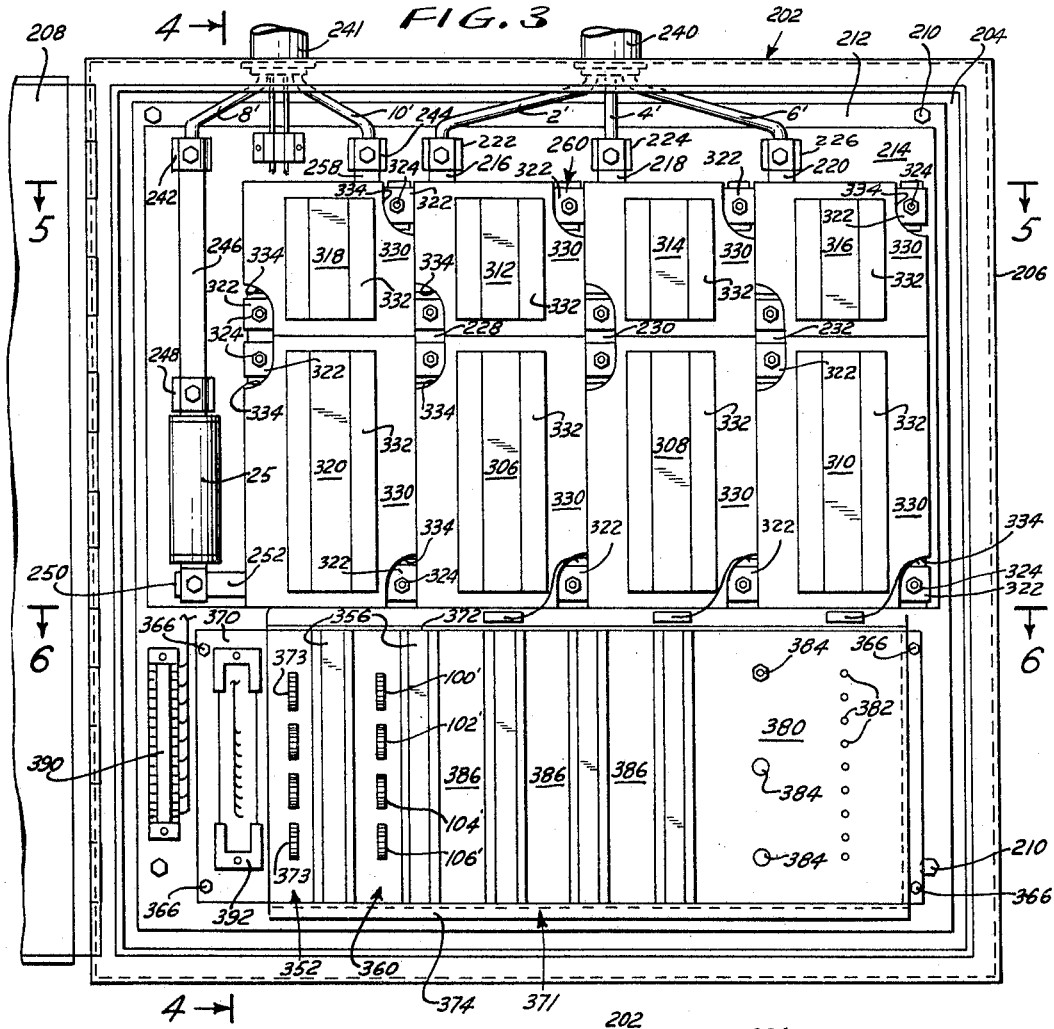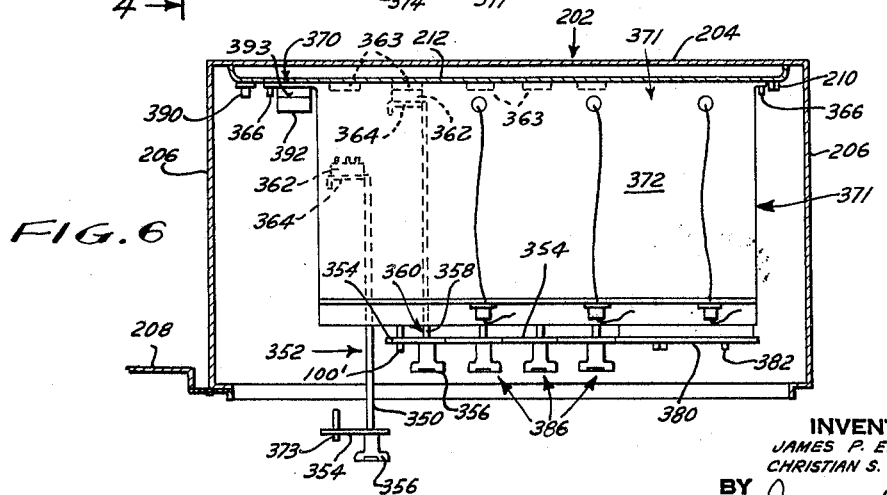

INVENTORS
JAMES P. ETTINGER.
CHRISTIAN S. OTTESON
BY
ATTORNEYS

INVENTORS
JAMES P. ETTINGER
CHRISTIAN S. OTTESON
BY
ATTORNEYS

United States Patent Office 3,483,433
Patented Dec. 9, 1969

3,483,433
MODULAR POWER SUPPLY
James P. Ettinger and Christian S. Otteson, Ridgefield,
Conn., assignors to Electric Regulator Corporation, Norwalk, Conn., a corporation of New York
Filed Jan. 31, 1968, Ser. No. 702,089
Int. Cl. H02b 1/00, 1/02
U.S. Cl. 317—119                                       44 Claims

ABSTRACT OF THE DISCLOSURE

A power supply assembly is provided in which the power-handling and control elements are arranged in modules; the power-handling leads are in the form of massive bus bars insulatedly mounted on the frame of the equipment, the power-handling modules being directly mounted on exposed portions of those bus bars for proper mechanical support and electrical connection; signal connections, both to the control and power-handling modules, are made by quick-detachable connectors, the modules are readily removable and replaceable, thus facilitating repair and change of electrical characteristics; the modules when in place defining a self-supporting structure.

---

The present invention relates to a power supply in which the most important, if not all, of the various operative components, both power-handling and control, are in the form of readily attachable and detachable modules, thereby to facilitate repair, replacement and modification of electrical characteristics. The modular approach permits the creation of small, light and compact assemblies, which are nevertheless capable of handling very large amounts of power with an exceptionally high degree of safety, particularly with regard to shock-prevention and overload-carrying.

Conventionally, power supplies in the large power-handling categories are extremely bulky, heavy and expensive. A traditional DC power supply designed to drive a multi-horsepower motor, e.g. one in the 150 H.P. range, comprises a piece of equipment of the size of a medium truck and weighing up to 8 tons. It consists of a combination of motors, generators and regulators linked together to change utility power to controlled output power. The need for such power supplies is particularly great where the utility power is in the form of AC and the motor to be driven is of the DC type, the power supply therefore having to convert the AC to DC while at the same time permitting control of the output power so that, for example, the speed of the motor may be adjusted and then regulated to remain constant over a wide range of load conditions.

Conventional equipment of this type is also difficult to maintain and repair. This is a particularly important disadvantage; the size and cost of the units make it impractical for most plants to have a standby unit. Consequently, if anything goes wrong with the power supply, the motor driven thereby must remain idle during the time it takes to repair or adjust the power supply, and the function of the motor must also cease. The economic loss involved in the "down time" of power supplies is therefore extremely significant.

The actual repair or replacement is usually quite time-consuming. Often many properly working parts must be disassembled or disconnected merely to gain access to the defective element. In addition, because of the factors outlined above, to make repairs involves considerable skill, and the availability of adequately trained maintenance personnel leaves much to be desired.

A further disadvantage of the conventional type of power supply is that it must in large measure be individually designed for each application. This not only makes for high initial cost but also greatly limits flexibility of use in a given plant. If the application requirements change radically, a redesign and reconstruction of the power supply as a whole is usually required.

The power supply of the present invention, when compared with conventional units of similar power-handling capacity, provides a staggeringly large reduction in size, weight and cost and a comparably large saving in repair and adjustment time, while simultaneously permitting radical change in operating characteristics merely by removing one control module and replacing it with another. More specifically, a 150 H.P. unit of the present invention, with appropriate heat dissipation features, measures only 21" x 21" x 12" and can be carried by two men, thus producing size and weight reductions from 60% to 90% when compared with prior art units of comparable power handling capacity. Virtually any component may be removed and replaced in a matter of seconds by unskilled personnel, sometimes without having to use any tools at all and in other instances having to use only a wrench. Initial cost savings up to 50% are realized, and total cost savings, taking into account radically decreased "down time," are considerably greater. Increased reliability and safety go hand in hand with these outstanding features.

In the power supply of the present invention, solid state components are used for power-handling as well as for control, an approach which is not novel in and of itself, and the use of such components contributes to the reduction in size and weight which is characteristic of the power supply of the present invention, but only in part. Prior art solid state power supplies, while smaller than conventional rotating electrical equipment units, are nevertheless significantly larger than the units of comparable power-handling capacity which have been made in accordance with the present invention. Those prior art solid state power supplies, it should be further noted, were not appreciably easier to repair or modify than the non-solid state units which preceded them and, indeed, often were so complex as to permit their being repaired only by exceptionally highly trained technical personnel.

The combination of extremely small size, extremely high safety and reliability, and extremely simple repair, replacement and modification is achieved in accordance with the present invention by a modular approach entirely novel in this field, with specific aspects of that modular approach imparting their own specific advantages. Thus the power handling leads are in the form of heavy bus bars insulatedly mounted on the framework of the equipment. As a result, the power supply is characterized by a high degree of safety, particularly with regard to resistance to overloads. These bus bars serve not only to conduct power to the power-handling solid state devices, but also serve to support those devices on the assembly. Each of the solid state power-handling devices, together with its associated heat-dissipating structure, is preferably in the form of a separate module adapted to be directly mounted on and clamped to appropriate portions of the bus bars. The modules are so constructed and arranged that when they are in position, the hardware which serves to mount them on and ensure proper electrical connection to the bus bars is readily accessible from the face of the unit, so that individual modules may be removed and replaced in a matter of seconds, and by an extremely simple manual operation such as the turning of a nut. The modules, when in position, preferably engage one another to define a self-supporting structure, thus rigidifying the unit and providing a very high degree of vibration and shock resistance. The modules are preferably provided with handles to facilitate their removal and replacement. Assemblies of control elements are likewise arranged in modular form, with those modules also being readily removable from and replaceable on the unit, preferably only by a pull-push action, electrical connections being accomplished by means of quick-detachable connectors of conventional type. Parameter adjusting means may be provided on one or more of the control modules so as to be accessible from the exterior thereof. If the operating characteristics of a power supply are to be modified, all that need be done is to replace one control module with another. Thus the power supply may virtually instantaneously be adapted to control the operation of a motor doing a brand new job. The failure of one component involves in many situations the removal and replacement only of that component, which is immediately accessible, and even where a number of components are mounted on a single module (as in the case of some of the control components) the removal and replacement of that individual component is greatly facilitated because it is made readily accessible on the module of which it forms a part when that module is removed from the assembly. The power-carrying parts of the power supply are insulated from that portion of the supply which is exposed, thus providing a safety factor against shock. The power section and the control or regulator section of the power supply are mechanically distinct as well as electrically separate, thus facilitating repair and maintenance.

The embodiment of the power supply here specifically illustrated is one designed to convert three-phase AC into DC and to drive a DC shunt motor in such fashion that the speed thereof may be accurately controlled and maintained, but it will be understood that this is by way of exemplification only, both as to general type of application and specific power and control circuitry, and that the modular power supply approach and the specific aspects thereof embodied in the disclosed power supply are applicable to a vast range of other applications.

To the accomplishment of the above, and to such other objects as may hereinafter appear, the present invention relates to the construction and arrangement of a modular power supply, as defined in the appended claims and as described in this specification, taken together with the accompanying drawings, in which:

FIG. 2 is a view similar to FIG. 1, but with the mounting plate for the control section in place, control modules mounted thereon, and three of the power modules mounted in place;

FIG. 3 is a view similar to FIG. 2, but with all of the modules in place;

Figure 4:
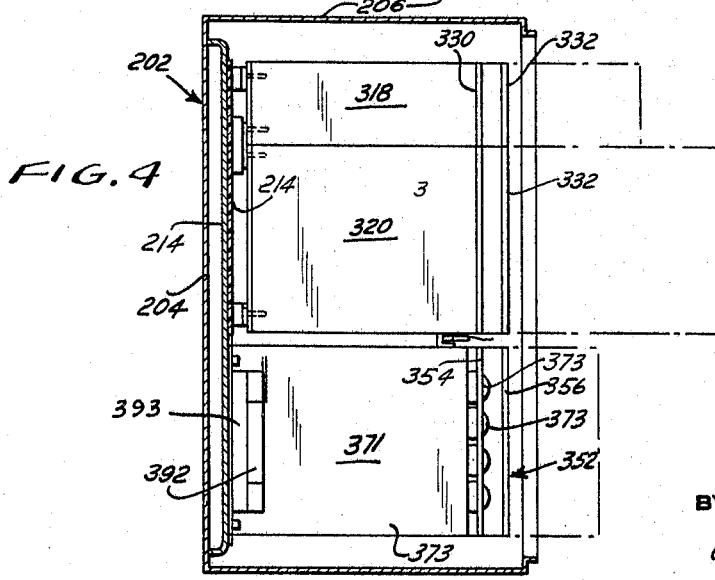
Figure 7:
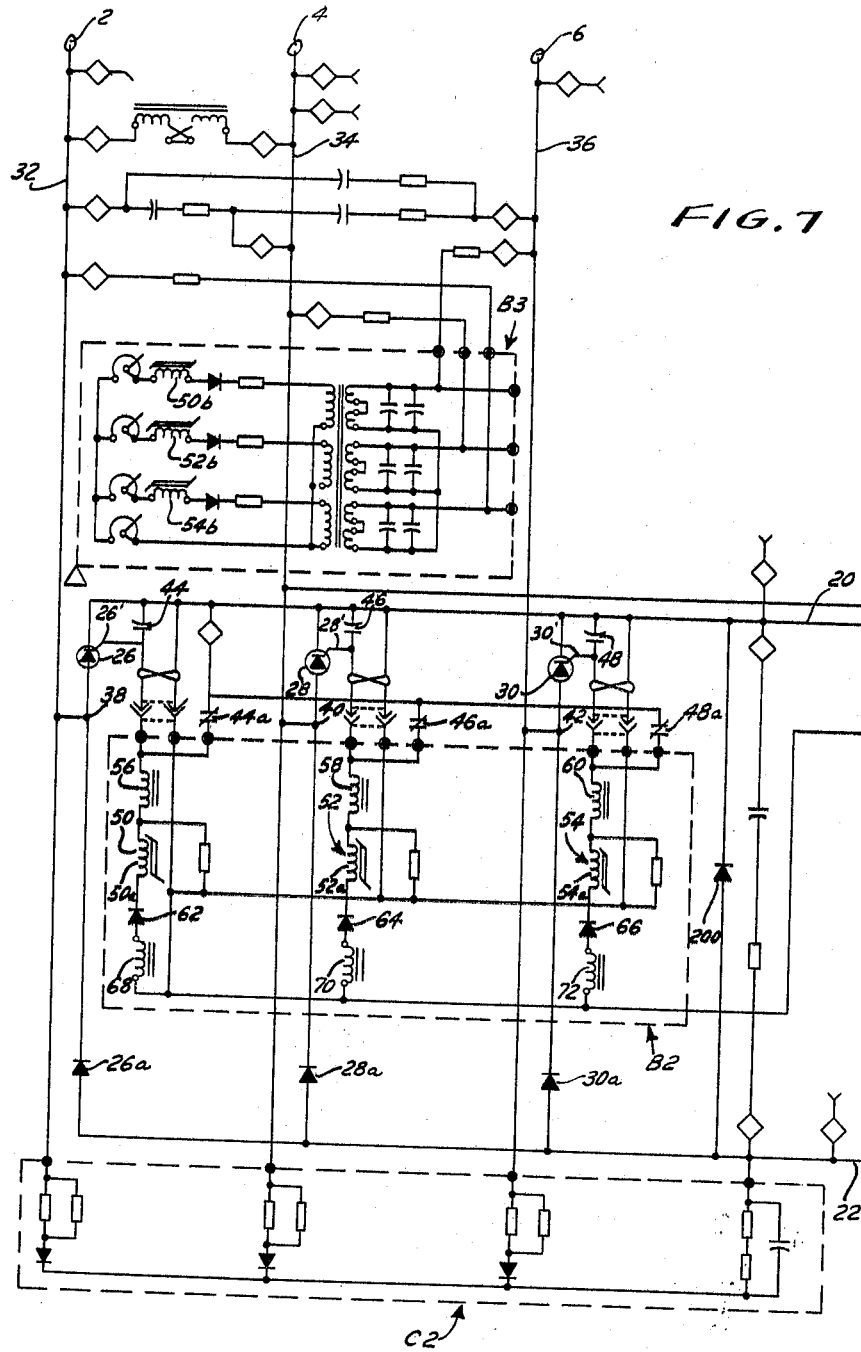
Figure 7A:
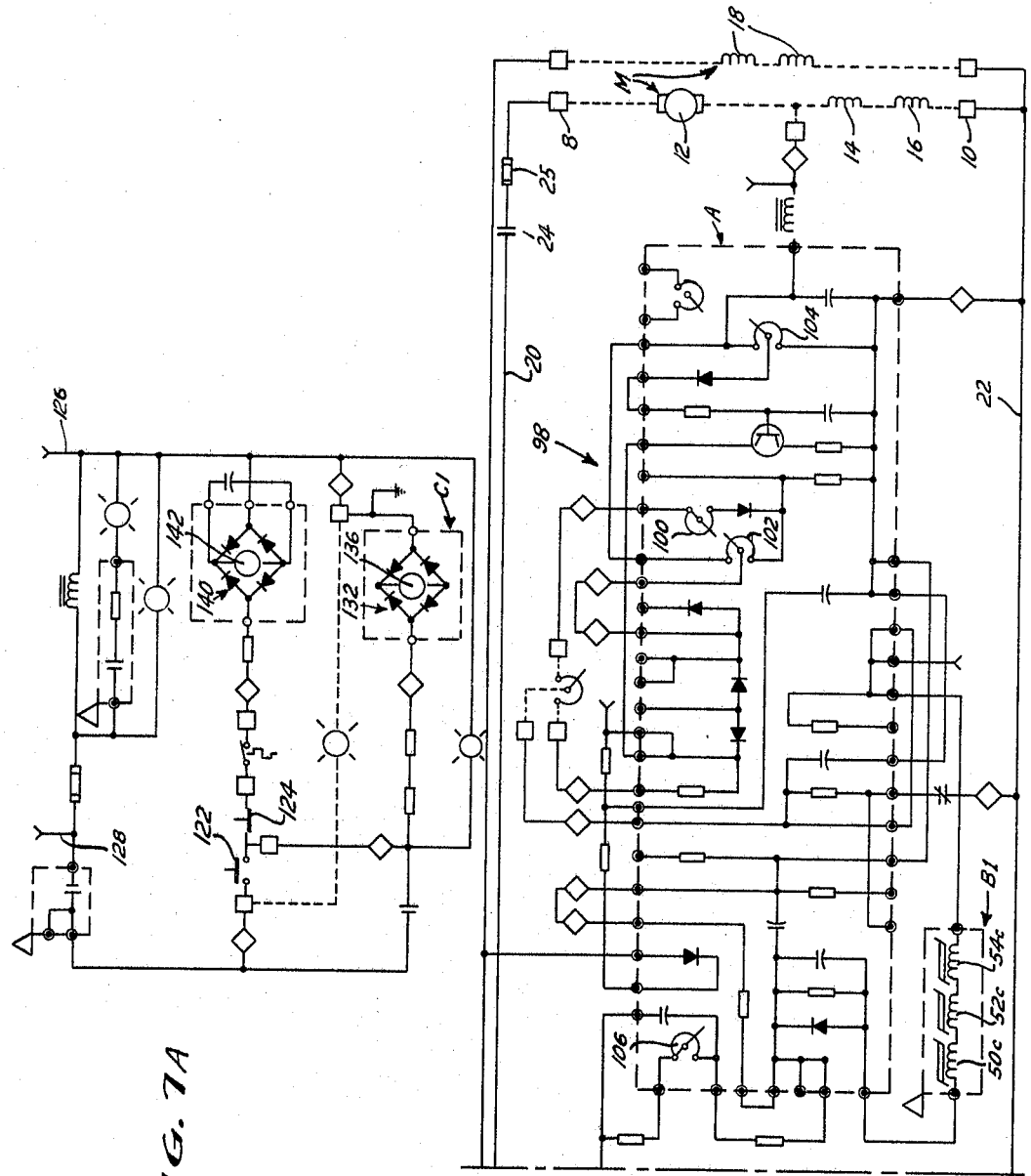

FIGS. 4, 5 and 6 are cross-sectional views taken along the lines 4—4, 5—5 and 6—6, respectively, of FIG. 3; and FIGS. 7 and 7A represent a circuit diagram of the illustrated embodiment.

EXEMPLARY CIRCUITRY—POWER-HANDLING AND CONTROL

The significance and advantages of the power supply construction of the present invention can perhaps best be appreciated in the light of the electrical requirements of the power supply. It therefore seems appropriate, before explaining the significant structural aspects involved, to first generally consider the circuitry which that structure must encompass. To this end, one exemplary embodiment of power supply circuitry is disclosed in FIG. 7. (Certain aspects of that circuitry have previously been disclosed and claimed in application Ser. No. 621,271, filed Mar. 7, 1967 by James P. Ettinger and entitled "On-Off Control of SCR Regulated Power Supply," which application is assigned to the same assignee as this one.) It is specifically designed to convert a three-phase AC input into a controllable DC output which in turn controllably drives a DC shunt field motor generally designated M. The three-phase alternating current input is applied at terminals 2, 4 and 6, and the DC output to the motor M is provided at terminals 8 and 10. The motor M has an armature 12, a commutating field 14 and a stabilizing field 16 connected in series with one another across the output terminals 8 and 10, and it also has an appropriately energized shunt field 18.

The power supply has power lines 20 and 22 connected to the terminals 8 and 10 respectively. An isolating on-off switch 24 is interposed in the line 20 adjacent the output terminal 8, and a fuse 25 is interposed in the line 20 between the switch 24 and the terminal 8. Connected between the lines 20 and 22 are three pairs of series-connected rectifiers 26 and 26a, 28 and 28a, and 30 and 30a respectively, the rectifiers 26, 28 and 30 being controlled rectifiers while the rectifiers 26a, 28a and 30a are conventional diodes. Lines 32, 34 and 36 extend from the input terminals 2, 4 and 6 respectively, to points 38, 40 and 42 respectively, between the rectifiers 26 and 26a, 28 and 28a, and 30 and 30a respectively. The controlled rectifiers 26, 28 and 30 have control electrodes 26', 28' and 30' respectively, each of which is associated with capacitors 44, 46 and 48 respectively and with switches 44a, 46a and 48a respectively, defined by normally closed but openable contacts. The control of the control electrodes 26', 28' and 30' is accomplished by magnetic amplifiers generally designated 50, 52 and 54 respectively. The magnetic amplifier 50 comprises an output winding 50a, a firing winding 50b and a control winding 50c, the magnetic amplifiers 52 and 54 being similarly constituted, with similar reference numerals identifying the individual windings. The output windings 50a–54a are connected at one end to their respective control electrodes 26'–30', via choke coils 56, 58 and 60 respectively, and at their other ends to the line 20 via rectifiers 62, 64 and 66 respectively, and choke coils 68, 70 and 72 respectively. The firing windings 50b–54b, designed to synchronize the conductive energization of the control electrodes 26'–30' with the three phases of input current at the input terminals 2, 4 and 6 respectively, may be connected respectively between the lines 32 and 34, 34 and 36, and 36 and 32.

The control windings 50c–54c are designed to be energized, during normal operation of the system, in accordance with the output voltage and to control the duration (initiation) of the conductive periods of the control rectifiers 26–30 in order to maintain the output voltage at a predetermined value. The circuitry for accomplishing this, involving the deriving of a signal corresponding to the output voltage, the comparing of that signal with a reference voltage, and the energization of the control windings 50c–54c in accordance with that comparison, is described in some detail in the aforementioned prior application Ser. No. 621,271 previously referred to. In general, the control circuitry is that which is contained within the broken line rectangle A of FIG. 7A, and for purposes of the instant application, which is not specific to circuitry, it may suffice to say that the control circuitry is provided with adjustable means 100, 102, 104 and 106 for controlling minimum speed, the IR compensation, the maximum current and the maximum speed of operation of the motor M respectively.

The on-off control of the power supply, which may be manually, automatically or semi-automatically actuated, is here illustrated as comprising a normally open start switch 122 and a normally closed stop switch 124. Leads 126 and 128 are provided from any suitable source of power, such as one phase of the AC supply to the input terminals 2, 4 and 6. The start and stop buttons 122 and 124 are connected in series with a full-wave rectifier 140 which feeds an electromagnet winding schematically indicated at 142, that winding being operatively connected to the normally closed switches 44a, 46a and 48a associated with the control electrodes 26'–30' respectively. It is preferred that the winding 142 constitutes the electromagnetic coil of a dashpot-damped sequential switch, a typical embodiment of which is disclosed in Cohen Patent 2,650,957, the switches 44a, 46a and 48a being constituted by different pairs of contacts on such a switch which are adapted to be opened and closed in predetermined sequence as the winding 142 is energized or de-energized. A second full wave rectifier 132 is connected between lines 126 and 128, the output from which feeds electromagnet winding 136 which, when energized, closes the normally open isolating switch 24 located in the line 20.

From the above general description, it will be seen that the power circuit, that is to say, that part of the system which must transmit and act upon the electrical power passing from input to output, includes the lines 32, 34 and 36, the controlled rectifiers 26a, 28a and 30a, the lines 20 and 22, the switch 24 and fuse 25. It also includes a rectifier 200 which is connected across the power lines 20 and 22. The control circuitry for actuating the switch 24 is in large part contained within the broken line rectangles C1 and C2, and this may, if desired, be considered as part of the power circuit, and thus modularized.

The remainder of the circuitry is mainly utilized for sensing and control. That portion thereof within the broken line rectangle A constitutes in general the sensing portion of the circuitry. That portion thereof enclosed within the broken line rectangles B1, B2 and B3 constitutes the bulk of the circuitry which triggers or controls the controlled rectifiers 26, 28 and 30 in accordance with signals derived from the sensing and reference circuitry mainly contained within the broken line rectangle A.

Only so much of the circuitry involved as is believed to be required for an understanding of the rationale and advantages of the structure involved in this invention has been described in any detail.

POWER-HANDLING MODULES AND MOUNTING THEREFOR BUS-BAR STRUCTURE

Turning now to the structure and arrangement of the power supply, it comprises a cabinet generally designated 202 of appropriate size having a bottom wall 204, side walls 206 and an openable cover 208. As has been indicated, the cabinet 202 may be of surprisingly small size considering the power handling capacity of the power supply, a cabinet measuring 24" x 24" x 12" being quite adequate for a power supply capable of driving a 150 H.P. DC motor. Mounted on the bottom wall 204 in any appropriate manner, as through nuts 210, is a support plate 212 on the upper portion of which a heavy insulating plate 214 is mounted in any appropriate fashion. A network of comparatively massive, substantially rigid, bus bars are mounted on the support plate 212, separated therefrom by the plate 214, those bars serving as the leads for power conduction. Vertically extending bus bars 216, 218 and 220 have their upper ends mounted on insulating support blocks 222, 224 and 226, and have their lower ends widened, as at 228, 230 and 232, and mounted on insulating support blocks 234, 236 and 238 respectively. The upper ends of the bus bars 216, 218 and 220 correspond to the input terminals 2, 4 and 6 of the circuit of FIG. 7, with external supply leads 2', 4' and 6' being connected thereto and extending out through conduit 240. A bus bar 246 extends down from the support block 242 to the support block 248, where one end of the fuse 25 is secured to it. The other end of the fuse 25 is secured to bus bar 252 where the latter is mounted on support block 250, bus bar 252 extending horizontally and terminating at 254, where it is supported on support block 256. Downwardly extending bus bar 258 has its upper end mounted on support block 244. It joins with a horizontally extending bus bar 260 having raised portions 262, 264, 266 and 268 supported on insulating blocks 270, 272, 274, and 276 respectively, and having depressed portions 278, 280 and 282 between the raised portions. The bus bars 216, 218 and 220 are at a raised elevation relative to the bus bar portions 278, 280 and 282, so that they can cross without electrical interconnection. To complete the bus bar network, there is a lower horizontal bus bar 284 having raised portions 286, 288 and 290 mounted on support blocks 292, 294 and 296 respectively, with the lower portions 298 and 300 between the raised portions, the bus bar 284 being electrically connected to an L-shaped bus bar 302 by inclined bus bar 304. If desired, in order to improve the electrical insulations between bus bar portions where they cross or otherwise, appropriate portions of the bus bars may be provided with sleeves of insulating material.

The upper ends of bus bars 246 and 258 correspond to the output terminals 8 and 10 respectively, of the circuit of FIG. 7A, to which external leads 8' and 10' are connected, the leads 8' and 10' extending out through conduit 241.

Bus bars 216, 218 and 220 correspond to circuit leads 32, 34 and 36 respectively. Bus bar 246 corresponds to that portion of line 20 between output terminal 8 and fuse 25. Bus bar 252 corresponds to that portion of line 20 between fuse 25 and switch 24. Bus bars 304 and 284 correspond to the remainder of line 20. Bus bar 260 corresponds to line 22. To aid in comparing the power circuitry of FIGS. 7 and 7A with the bus bar structure, circuit reference numerals are applied in parentheses, where appropriate, to the showing in FIG. 1.

POWER-HANDLING MODULES

The remainder of the power circuitry, defined by the controlled rectifiers 26, 28 and 30, the non-controlled rectifiers 26a, 28a and 30a, the across-the-line rectifier 200, and the switch 24 are all mounted on individual modules adapted to be readily secured to and detached from the appropriate bus bars in order to complete the power circuit. The controlled rectifiers 26, 28 and 30, and electrical connections to the various electrodes including the control electrodes 26', 28' and 30' respectively, are incorporated into modules 306, 308 and 310 respectively. The non-controlled rectifiers 26a, 28a and 30a respectively, are incorporated into modules 312, 314 and 316 respectively. The across-the-line rectifier 200 is incorporated into module 318. The switch 24, together with the circuitry enclosed within the broken-line rectangle C1, may be incorporated into module 320.

The structure of a typical rectifier module and the structure by means of which that module is adapted to be mounted on, secured to and electrically connected to appropriate sections of the bus bars is disclosed in some particularity, and certain aspects thereof are claimed in our copending Ser. No. 683,390, filed Nov. 14, 1967, and entitled "Captive Nut Assembly" which is assigned to the assignee of this application. The disclosure of said aforementioned application is incorporated into this application by reference, it being understood that the specific structure there disclosed and claimed, while believed to be exceedingly advantageous in facilitating the connection and disconnection of the modules from the power supply, is not essential to those aspects of the power supply structure here described and claimed.

As is made clear by said aforementioned application, and as may be seen particularly from FIG. 5, each of the rectifier modules 306–318 comprises a metallic structure having diagonally opposed conductive mounting feet or terminals 322 carrying securing devices such as captive nuts 324, which nuts are adapted to register and engage with appropriately positioned screws 326 extending outwardly from appropriate portions of the rigidly mounted bus bars. Engagement between the nuts 324 and the corresponding screws 326 acts to firmly clamp the module feet 322 against those portions of the bus bars which carry the screws 326, thereby to mount and secure the modules firmly in position and at the same time to press the conductive feet 322 into firm electrical connection with the bus bars. The feet 322 on a given module are electrically connected in any appropriate manner with the electrical element or elements carried thereby, such as a rectifier, that element thus completing the electrical circuit between the separated points constituted by the corresponding screws 326.

Each of the modules includes, in addition to the appropriate rectifier, heat dissipating structure generally designated 328 which may take any of a wide variety of forms. In order to provide adequate space for air circulation and hence heat dissipation, the modules are of appreciable height, extending out to an appreciable distance from the mounting feet 322. At their outer ends the modules are provided with laterally extending outer plates 330, preferably insulated from the current-carrying portions of the modules, thereby to function as a protective cover effectively preventing unauthorized and dangerous contact with large portions of the circuit. The plates 330 for the individual modules are preferably all located at the same distance out from the base plate 214 and are preferably of such dimensions as to engage with one another both horizontally and vertically when the modules are in place, thereby to define a self-supporting structure which rigidifies the modules when they are mounted in position and provides a significant degree of vibration- and shock-protection.

Each of the modules may be provided with a handle 332 extending out from the plate 330 so that the module may readily be grasped to be moved into or out from position. The face of the handle 332 is preferably labeled in some fashion, thereby providing an orientation guide ensuring that the module will not be inserted upside down.

In order to provide access to the captive nuts 324, the outer plates 330 are relieved at their diagonally opposite corners 334 in registration with the captive nuts 324, thus providing space into which a socket wrench may be inserted to engage with and appropriately manipulate the captive nuts 324.

The module 320 is similar in general character to the other power modules and differs therefrom essentially only in the character of the electrical unit or units which it carries.

As may clearly be seen from FIG. 3, which discloses all of the power modules in place, the fuse 25 is located to one side of the power-handling module assembly, thereby facilitating its replacement when necessary without having to disturb the remainder of the power circuit.

Electrical connection between the magnetic amplifiers 50–54 and the control electrodes 26'–30' of the controlled rectifiers 26–30 on modules 306–310 is made by quick detachable connectors 336 readily accessible at the exposed lower edges of the modules respectively.

The power-handling modules 306–330 are therefore each individually mounted on, clamped and electrically connected to, and supported by appropriate bus bar portions, from which they are readily disconnected and removed when appropriate. The bus bar network is structurally strong and has a tremendous overload-handling capacity. It is reliably insulated from the cabinet 202 by the insulating plate 214, and is itself removable from the cabinet as a unit along with that plate 214.

SENSING AND CONTROL MODULES
AND MOUNTING THEREFOR

As has been seen from the above description, the power-carrying bus bars and modularized elements occupy the upper portion of the interior of the cabinet 202. The remainder of the circuitry, generally comprising the circuitry for sensing the electrical output and for controlling the operation of the power supply, and in particular the controlled rectifiers 26–30 of the specific power supply circuitry here illustrated, are mounted in the lower portion of the enclosure 202. As disclosed, the same general approach of modularization characteristic of the power circuitry is also applied to the sensing and control circuitry, with the end in view of facilitating repair and replacement, making adjustment of the output parameters easy and accurate, and permitting the use of essentially the same power supply structure to provide for different degrees and types of output control without having to redesign and reconstruct the entire unit. However, since the sensing and control circuitry in general operates on low values of current and power, the problems presented are to some extent different from those involved in the modularization of the power handling circuitry. The need for heat dissipation and power handling capacity are minimal, but the precision and accuracy of the electrical connections to be made is more critical.

The circuit elements which, in response to a signal representative of the type of control to be exercised, carry out the actual control of the on- and off-times of the controlled rectifiers 26–30 are, as has been noted, those enclosed within the broken line rectangles B1, B2 and B3 of FIGS. 7 and 7A. These electrical components may all be mounted on the bottom wall 350 of a module generally designated 352, that module being provided with an outer plate 354 from which a handle 356 extends outwardly. The circuitry designed to produce the control signal which acts upon the circuitry mounted in module 350 is that which, in general, is included within the broken line rectangle A of FIG. 7A. That circuitry may be mounted on the bottom wall 358 of a module generally designated 360, which is also provided with an outer plate 354 and an outwardly extending handle 356. The electrical connections to the elements carried by the modules 352 and 360 respectively, electrically communicate with the male portion 362 of a conventional quick detachable connector assembly carried by inner end walls 364 of the modules 352 and 360 respectively.

Mounted on the lower portion of the bottom wall 204 of the cabinet 202, as by means of screws 366 received in the threaded holes 368 (see FIG. 1), is a supporting chassis 370 for the sensing and control circuitry. A sub-enclosure 371 defined by top and bottom walls 372 and 374 and side walls 373 forms a part of the chassis 370, the modules 352 and 360 being slidably received through the open front end of that sub-enclosure 371, and being guided and supported at top and bottom by the walls 372 and 374 respectively. At the inside of that sub-enclosure 371 and appropriately positioned, are the female portions 363 of the quick detachable connectors cooperable with the male portions 362 carried by the modules 352 and 360 respectively. Thus with the sub-enclosure 371 in position the modules 352 and 360, each carrying the appropriately selected electrical components, may be physically and electrically connected to and disconnected from the power supply merely by grasping them and pushing them into or pulling them out from the position in which the quick detachable connector sections 362 and 363 engage with one another.

The adjustment elements 100–106 above referred to in connection with the control circuitry 98 may be provided with manually accessible wheels 100'–106' which pass through and are accessible from the outside of the outer plate 354 for the appropriate module 360, thereby enabling adjustment of the respective operating characteristics in an extremely facile fashion. Similarly, externally accessible adjustable elements 373 may be provided on the module 352 if desired for bias control.

The sub-enclosure 371 may comprise a compartment 376 in which, in the embodiment here disclosed, the circuit elements not included in any module may be mounted. It may, for example, contain, among other things, the sequential switches 44a–48a, together with electromagnetic and mechanical parts arranged to actuate them, such as the rectifier 140 and the electromagnet winding 142, all of this being enclosed within the rectangle 378 shown in FIG. 2. The compartment 376 may be provided with a cover 380, and it has been found very advantageous to provide on that cover 380, and accessible from the outer surface thereof, a plurality of test point terminals 382 to which appropriate electrical connection may be made when desired, as well as indicator lights 384 to show when the power supply is in one operational status or another. In addition to or in place of test points a multi-meter may be provided on this cover.

As here specifically disclosed the sensing and reference circuitry is carried by module 360 and the trigger circuitry is carried by module 362. The space between these two modules, on the one hand, and the compartment 376, on the other hand, is filled by a plurality of blank modules each generally designated 386, which may, however, be operationally used to carry additional or different control and/or sensing circuitry, depending upon the particular application for which the power supply is designed.

Figure 1:
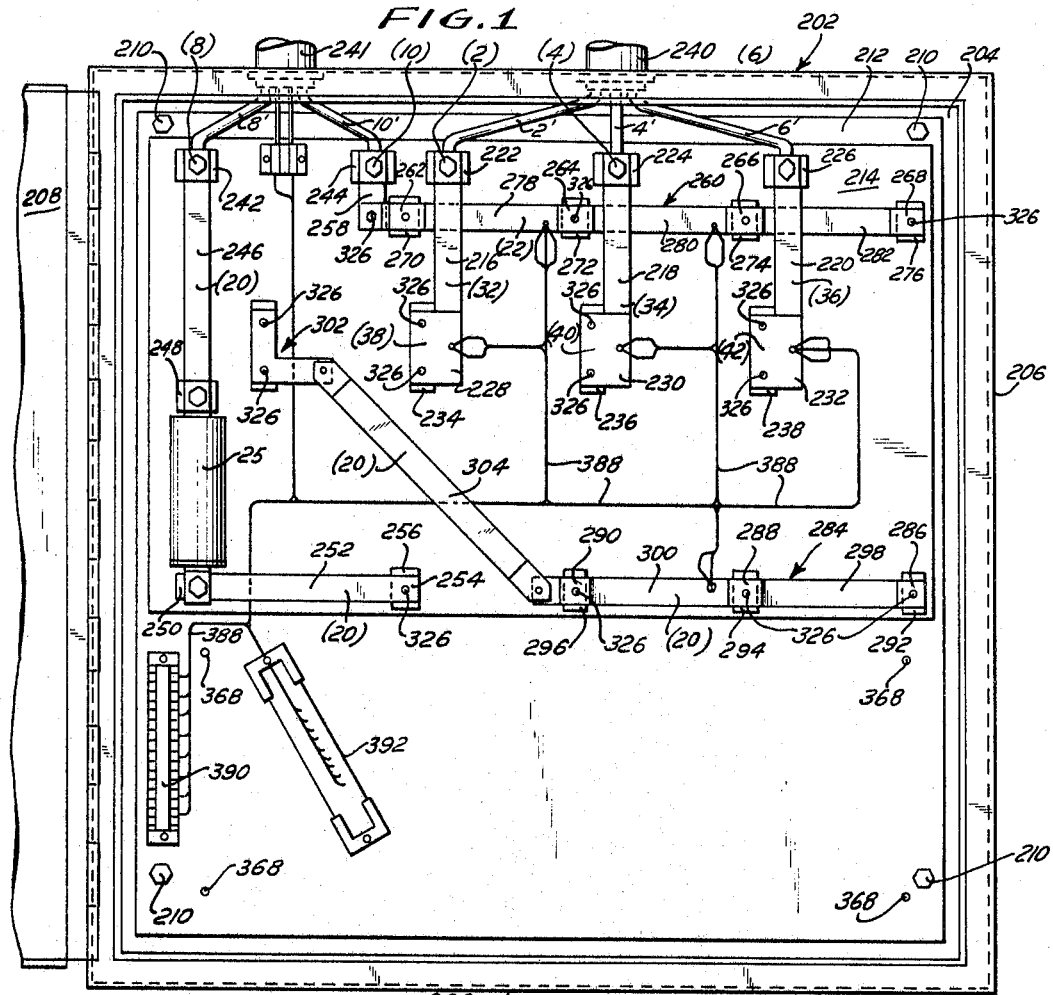
FIG. 1 is a front plan view of the illustrated embodiment showing the enclosure door open, the modules all removed and the mounting plate for the control section removed.

The lines generally designated 388 in FIG. 1 represent electrical connection wires, single or plural, used in the control circuitry. As part of those electrical connections a terminal block 390 is mounted on the cabinet bottom wall 204, and one-half 392 of a quick detachable connector is connected to certain of those wires, the cooperating connector half 393 being mounted on the chassis 370.

The front plates 354 of the modules carried by the sub-enclosure 371 are so dimensioned as to substantially fill the opening at the front face of that sub-enclosure, and they are further so dimensioned as to engage one another when the modules are in place, thereby providing a self-supporting and rigidifying structure, as well as inhibiting the entry of dirt, dust and other extraneous substances into the sub-enclosure. This last is a desirable feature since it serves to protect the security of the delicate electrical connections.

If something goes wrong with the sensing circuitry, all that need be done is to pull out the module 360, thereby exposing the individual circuit elements, spread out on the wall 358. If need be, a separate control module 360 can be kept on hand as a spare and inserted into the sub-enclosure 371 while repairs are being made on the withdrawn module, so that down time for the equipment may be measured in seconds. In any event, the accessibility to the individual components of the control circuitry is so much greater than in prior art devices that the amount of time required for repair is but a very small fraction of that which was formerly thought necessary. The same considerations apply with regard to the trigger circuitry carried by the module 352. Moreover, when appropriate, all of the sensing and control circuitry, as a unit, can be removed from the enclosure 202 and replaced by another subassembly merely by loosening the four nuts 366, separating the connector parts 392, 393, and removing the chassis 370 with all of the parts mounted thereon.

A given power supply can be converted from one mode of operation to another merely by removing one or more of the modules 352 and 360 and replacing them with others having different electrical characteristics. This involves but a few seconds and gives dramatic indication of the tremendous flexibility of use which is afforded to the power supply by reason of the constructions and arrangements here disclosed.

The power modules 306–320 are positively held in place by the captive nuts 324 engageable with the rigidly mounted screws 326. The control circuitry modules 352, 360 and 386 may be held in place exclusively by the friction involved in the engagement between the male and female portions 362 and 363 of the quick disconnect connectors, but, if desired, more positive retention may be provided, such as spring-latches mounted on the top or bottom wall 372 or 374 and engageable with the front walls 354 of the modules.

While but a single embodiment of the present invention has been here specifically disclosed, it will be apparent that this is by way of exemplification only, and that many variations may be made therein, all without departing from the spirit of the invention as defined in the following claims.

We claim:
1. A power supply comprising a base, a plurality of bus bars mounted on said base, comprising power-conducting leads, and having exposed bus bar ends located in spaced pairs, securing elements on said base, and a plurality of modules each comprising a support and having terminals, an electrical unit mounted thereon and adapted to be electrically interposed between a given pair of bus bar ends, and electrical connection between said unit and said terminals on said module, said modules further comprising securing elements detachably cooperable with said securing elements on said base for detachably securing said modules in position on said base, said module terminals then engaging and making electrical connection with said bus bar ends.

2. The power supply of claim 1, in which said modules extend outwardly from said base to an outer surface, said terminals and securing elements being located adjacent said base and said securing elements being accessible from said outer surface.

3. The power supply of claim 2, in which said securing elements on said base are located at said bus bar ends and said securing elements on said module are located at said terminals, said securing elements being effective to clamp said modules and the terminals thereon to said bus bar ends.

4. The power supply of claim 2, in which said modules, adjacent said outer surface, are provided with laterally extending members, said members of adjacent modules engaging one another when said modules are in position on said base, whereby said members define a module-supporting structure.

5. The power supply of claim 2, in which said modules, adjacent said outer surface, are provided with laterally extending members, said members of adjacent modules engaging one another when said modules are in position on said base, whereby said members define a module-supporting structure, and in which said laterally extending members are provided with outwardly extending handles.

6. The power supply of claim 2, in which said modules, adjacent said outer surface, are provided with laterally extending members, said members of adjacent modules engaging one another when said modules are in position on said base, whereby said members define a module-supporting structure, and in which said securing means on said modules are located at diagonally opposite points thereon.

7. The power supply of claim 2, in which said modules, adjacent said outer surface, are provided with laterally extending members, said members of adjacent modules engaging one another when said modules are in position on said base, whereby said members define a module-supporting structure, and in which said securing means on said modules are located at diagonally opposite points thereon, said laterally extending members being relieved in registration with said points so as to provide access to said securing means.

8. The power supply of claim 2, in which said securing elements on said base are located at said bus bar ends and said securing elements on said module are located at said terminals, said securing elements being effective to clamp said modules and the terminals thereon to said bus bar ends, and in which said modules, adjacent said outer surface, are provided with laterally extending members, said members of adjacent modules engaging one another when said modules are in position on said base, whereby said members define a module-supporting structure.

9. The power supply of claim 2, in which said securing elements on said base are located at said bus bar ends and said securing elements on said module are located at said terminals, said securing elements being effective to clamp said modules and the terminals thereon to said bus bar ends, in which said modules, adjacent said outer surface, are provided with laterally extending members, said members of adjacent modules engaging one another when said modules are in position on said base, whereby said members define a module-supporting structure, and in which said laterally extending members are provided with outwardly extending handles.

10. The power supply of claim 2, in which said securing elements on said base are located at said bus bar ends and said securing elements on said module are located at said terminals, said securing elements being effective to clamp said modules and the terminals thereon to said bus bar ends, in which said modules, adjacent said outer surface, are provided with laterally extending members, said members of adjacent modules engaging one another when said modules are in position on said base, whereby said members define a module-supporting unit, and in which said securing means on said modules are located at diagonally opposite points thereof.

11. The power supply of claim 2, in which said securing elements on said base are located at said bus bar ends and said securing elements on said module are located at said terminals, said securing elements being effective to clamp said modules and the terminals thereon to said bus bar ends, in which said modules, adjacent said outer surface, are provided with laterally extending members, said members of adjacent modules engaging one another when said modules are in position on said base, whereby said members define a module-supporting structure, and in which said securing means on said modules are located at diagonally opposite points thereof, said laterally extending members being relieved in registration with said points so as to provide access to said securing means.

12. The power supply of claim 1, in which said securing elements on said base are located at said bus bar ends and said securing elements on said module are located at said terminals, said securing elements being effective to clamp said modules and the terminals thereon to said bus bar ends.

13. The power supply of claim 1, in which said bus bars are rigidly mounted on said base by means of insulators.

14. The power supply of claim 13, in which said securing elements on said base are located at said bus bar ends and said securing elements on said module are located at said terminals, said securing elements being effective to clamp said modules and the terminals thereon to said bus bar ends.

15. The power supply of claim 13, in which said securing elements on said base are located at said bus bar ends and said securing elements on said module are located at said terminals, said securing elements being effective to clamp said modules and the terminals thereon to said bus bar ends, and in which said modules extend outwardly from said base to an outer surface, said terminals and securing elements being located adjacent said base and said securing elements being accessible from said outer surface.

16. The power supply of claim 13, in which said securing elements on said base are located at said bus bar ends and said securing elements on said module are located at said terminals, said securing elements being effective to clamp said modules and the terminals thereon to said bus bar ends, in which said modules extend outwardly from said base to an outer surface, said terminals and securing elements being located adjacent said base and said securing elements being accessible from said outer surface, and in which said modules, adjacent said outer surface, are provided with laterally extending members, said members of adjacent modules engaging one another when said modules are in position on said base, whereby said members define a module-supporting structure.

17. The power supply of claim 13, in which said securing elements on said base are located at said bus bar ends and said securing elements on said module are located at said terminals, said securing elements being effective to clamp said modules and the terminals thereon to said bus bar ends, in which said modules extend out from said base to an outer surface, said terminals and securing elements being located adjacent said base and said securing elements being accessible from said outer surface, and in which said modules, adjacent said outer surface, are provided with laterally extending members, said members of adjacent modules engaging one another when said modules are in position on said base, whereby said members define a module-supporting structure, and in which said laterally extending members are provided with outwardly extending handles.

18. The power supply of claim 13, in which said securing elements on said base are located at said bus bar ends and said securing elements on said module are located at said terminals, said securing elements being effective to clamp said modules and the terminals thereon to said bus bar ends, in which said modules extend outwardly from said base to an outer surface, said terminals and securing elements being located adjacent said base and said securing elements being accessible from said outer surface, and in which said securing means on said modules are located at diagonally opposite points thereon.

19. The power supply of claim 13, in which said modules extend outwardly from said base to an outer surface, said terminals and securing elements being located adjacent said base and said securing elements being accessible from said outer surface.

20. The power supply of claim 13, in which said modules extend outwardly from said base to an outer surface, said terminals and securing elements being located adjacent said base and said securing elements being accessible from said outer surface, and in which said modules, adjacent said outer surface, are provided with laterally extending members, said members of adjacent modules engaging one another when said modules are in position on said base, whereby said members define a module-supporting structure.

21. The power supply of claim 13, in which said modules extend outwardly from said base to an outer surface, said terminals and securing elements being located adjacent said base and said securing elements being accessible from said outer surface and in which said modules, adjacent said surface, are provided with laterally extending members, said members of adjacent modules engaging one another when said modules are in position on said base, whereby said members define a module-supporting structure, and in which said laterally extending members are provided with outwardly extending handles.

22. The power supply of claim 13, in which said modules extend outwardly from said base to an outer surface, said terminals and securing elements being located adjacent said base and said securing elements being accessible from said outer surface, and in which said securing means on said modules are located at diagonally opposite points thereon.

23. The power supply of claim 13, in which said securing elements on said base are located at said bus bar ends and said securing elements on said module are located at said terminals, said securing elements being effective to clamp said modules and the terminals thereon to said bus bar ends and in which said securing means on said modules are located at diagonally opposite points thereon.

24. The power supply of claim 1, in which said securing means on said modules are located at diagonally opposite points thereon.

25. The power supply of claim 13, in which at least some of said modules comprise electrical units having control circuitry connected to additional terminals, and in which there is cooperating control circuitry in said power supply external of said module and electrically connected to said additional terminals by quick-detachable connectors.

26. The power supply of claim 1, in which at least some of said modules comprise electrical units having control circuitry connected to additional terminals and in which there is cooperating control circuitry in said power supply external of said module and electrically connected to said additional terminals by quick-detachable connectors.

27. The power supply of claim 26, in which a fuse is electrically connected between two bus bar ends located to one side of said modules, thereby rendering said fuse accessible without having to remove any of said modules.

28. The power supply of claim 26, comprising rectifiers and controlled rectifiers mounted on different ones of said modules together with appropriate heat-dissipating structure.

29. The power supply of claim 26, comprising rectifiers and controlled rectifiers mounted on different ones of said modules together with appropriate heat-dissipating structure, and further comprising parameter-sensing means and control means mounted on still different ones of said modules.

30. The power supply of claim 1, in which a fuse is electrically connected between two bus bar ends located to one side of said modules, thereby rendering said fuse accessible without having to remove any of said modules.

31. The power supply of claim 30, comprising rectifiers and controlled rectifiers mounted on different ones of said modules together with appropriate heat dissipating structure.

32. The power supply of claim 30, comprising rectifiers and controlled rectifiers mounted on different ones of said modules together with appropriate heat-dissipating structure, and further comprising parameter-sensing means and control means mounted on still different ones of said modules.

33. The power supply of claim 1, comprising rectifiers and controlled rectifiers mounted on different ones of said modules together with appropriate heat-dissipating structure.

34. The power supply of claim 1, comprising rectifiers and controlled rectifiers mounted on different ones of said modules together with appropriate heat-dissipating structure, and further comprising parameter-sensing means and control means mounted on still different ones of said modules.

35. A power supply comprising a base, power conducting leads insulatedly mounted thereon and having rigidly supported massive terminal portions, a plurality of modules having terminal portions each of said modules comprising an electrical unit electrically connected to and mechanically supported on massive terminal portions, said terminal portions of said modules being adapted to register and operatively engage with said terminal portions on said base, and means for detachably securing said terminal portions respectively to one another.

36. The power supply of claim 35, in which said securing means are comprised by engageable elements mounted on said terminal portions respectively.

37. The power supply of claim 36, in which said modules extend outwardly from said base to an outer surface, said terminal portions and said securing means being located adjacent said base and said securing means being accessible from said outer surface.

38. The power supply of claim 36, in which said modules extend outwardly from said base to an outer surface, said terminal portions and said securing means being located adjacent said base and said securing means being accessible from said outer surface, and in which said modules, adjacent said outer surface, are provided with laterally extending members, said members of adjacent modules engaging one another when said modules are in position on said base, whereby said members define a module-supporting structure.

39. The power supply of claim 35, in which said modules extend outwardly from said base to an outer surface, said terminal portions and said securing means being located adjacent said base and said securing means being accessible from said outer surface.

40. The power supply of claim 35, in which said modules extend outwardly from said base to an outer surface, said terminal portions and said securing means being located adjacent said base and said securing means being accessible from said outer surface, and in which said modules, adjacent said outer surface, are provided with laterally extending members, said members of adjacent modules engaging one another when said modules are in position on said base, whereby said members define a module-supporting structure.

41. The power supply of claim 35, in which at least some of said modules comprise electrical units having control circuitry connected to additional terminals, and in which there is cooperating control circuitry in said power supply external of said module and electrically connected to said additional terminals by quick-detachable connectors.

42. The power supply of claim 35, in which a fuse is electrically connected between two bus bar ends located to one side of said modules, thereby rendering said fuse accessible without having to remove any of said modules.

43. The power supply of claim 35, comprising rectifiers and controlled rectifiers mounted on different ones of said modules together with appropriate heat-dissipating structure.

44. The power supply of claim 35, comprising rectifiers and controlled rectifiers mounted on different ones of said modules together with appropriate heat-dissipating structure, and further comprising parameter-sensing means and control means mounted on still different ones of said modules.

References Cited

UNITED STATES PATENTS

| 3,303,395 | 2/1967 | Eck | 317—119 |
| 3,327,176 | 6/1967 | Rexroad | 174—59 X |

LARAMIE E. ASKIN, Primary Examiner

G. P. TOLIN, Assistant Examiner

U.S. Cl. X.R.

317—100